United States Patent [19]

Bosisio

[11] Patent Number: 4,853,490

[45] Date of Patent: Aug. 1, 1989

[54] LAMINATED PAPER-PLASTIC INSULATING TAPE AND CABLE INCLUDING SUCH TAPE

[75] Inventor: Claudio Bosisio, Brembate Sotto, Italy

[73] Assignee: Societa' Cavi Pirelli S.p.A., Milan, Italy

[21] Appl. No.: 129,329

[22] Filed: Dec. 3, 1987

Related U.S. Application Data

[63] Continuation-in-part of Ser. No. 927,840, Nov. 5, 1986, abandoned.

[30] Foreign Application Priority Data

Nov. 8, 1985 [IT] Italy .............................. 22768 A/85

[51] Int. Cl.[4] .......................... H01B 7/02; B32B 23/08

[52] U.S. Cl. ........................... 174/25 R; 174/120 FP; 174/121 B; 428/513; 428/530; 428/537.5

[58] Field of Search ...................... 428/311.1, 511, 530, 428/535, 537.5, 513; 174/25 C, 25 R, 20 FP, 121 B

[56] References Cited

U.S. PATENT DOCUMENTS

| | | | |
|---|---|---|---|
| 3,749,812 | 7/1973 | Reynolds et al. | 174/25 R |
| 3,775,549 | 11/1973 | Matsuda et al. | 174/25 R |
| 3,928,705 | 12/1975 | Loft et al. | 174/25 C |
| 3,959,549 | 5/1976 | Penczynski et al. | 428/311.1 X |
| 4,150,188 | 4/1979 | Brulet | 428/530 X |
| 4,407,697 | 10/1983 | Sadler et al. | 428/537.5 |
| 4,417,093 | 11/1983 | Occhini et al. | 174/25 C |
| 4,419,408 | 12/1983 | Schmukler et al. | 428/530 X |
| 4,571,357 | 2/1986 | Hata et al. | 428/511 X |

FOREIGN PATENT DOCUMENTS

| | | | |
|---|---|---|---|
| 8204872 | 3/1982 | France . | |
| 107861 | 2/1982 | Japan | 428/511 |
| 1402612 | 7/1972 | United Kingdom . | |

OTHER PUBLICATIONS

"Method of Thermally Upgrading Insulating Paper Using Alkyl-Naphthalene Oil"; Miyoshi; IEEE Transactions on Elec. Insul., vol. E1-11, No. 3, Sep. (1976).

*Primary Examiner*—George F. Lesmes
*Assistant Examiner*—M. A. Katz
*Attorney, Agent, or Firm*—Brooks Haidt Haffner & Delahunty

[57] ABSTRACT

A composite tape for forming at least part of the insulation of a high voltage electrical cable, particularly an oil-filled cable, and a cable including such insulating tape. The composite tape includes at least one layer of paper tape having a borate or silicate weight content in the range form 0.1 to 3% of the weight of the paper bonded to at least one surface or the surfaces of a film of bi-oriented polymeric plastic material by a copolymer layer which has a thickness of from about 1-10 microns. The thickness of all the plastic material in the composite tape is in the range from 10 to 30% of the total thickness of the tape. Preferred polymeric materials are polypropylene and polymethylpentene. A bonding material can be propylene-ethylene copolymer.

16 Claims, 1 Drawing Sheet

LAMINATED PAPER-PLASTIC INSULATING TAPE AND CABLE INCLUDING SUCH TAPE

This application is a continuation-in-part of application Ser. No. 927,840 filed Nov. 5, 1986, now abandoned and entitled Laminated Paper-Plastic Insulating Tape and Cable Including Such Tape.

The present invention relates to a composite tape for the insulation of electrical cables, in particular, of the oil-filled type, as well as an electrical cable impregnated with fluid oil, in which at least a part of the insulation is obtained by windings of said tape.

In the transmission of electrical power at very high voltages, namely, up to about 1000 KV, cables having an insulation of cellulose paper impregnated with fluid oil are normally used.

At these voltage values, the dielectric losses in the insulation, and in particular in the paper, cause development of heat which requires the adoption of appropriate, cooling systems which are not quite practical and have an associated cost or, alternatively, reduce considerably the power which can be transmitted by a given cable. The dielectric losses depend substantially on the value of the so-called loss angle delta (more precisely, the value of the tangent of said angle is considered) and, to a smaller extent, on the relevant dielectric constant $\epsilon_r$ of the cellulose paper.

The delta tangent (tg $\delta$) value of the cellulose paper (and therefore of the corresponding dielectric losses) has been constantly reduced, in the last ten year periods, from 3% to 1.5% for the best papers, by virtue of improvements in the production process, such as the use of deionized water for the mix preparation.

However, these values are still too high when cellulose paper is used for very high voltages, so that the adoption of a forced cooling system is necessary to dissipate the heat due to the dielectric losses. To reduce said dielectric losses, it has been proposed to further reduce the delta tangent value of the insulation by providing a mixed insulation composed of tapes of paper and of tapes of a plastic material, such as polypropylene, which has a very low delta tangent with respect to paper and also $\epsilon_r$ values lower than those of cellulose paper. The insulation is effected by winding up alternately the paper tapes and the plastic tapes or by making use of preformed laminated structures comprising one or two paper tapes coupled with a layer of plastic material obtained by extrusion, or by providing bonding agents between the layers.

In these structures, it is convenient for the layer of plastic material to have a thickness relative to the total thickness of the tape, so that the resulting average value of delta tangent is reduced as much as possible, for instance to values of the order of 0.7–1%.

A drawback of these layered structures is that the plastic material is not compatible with the impregnating oil because, in contact with the oil, it swells. As the plastic material is present in large amounts, said swelling may cause dangerous stresses inside the insulating layer. In fact, owing to the swelling, the layers of synthetic material, in particular, when hot, exert radial pressures which may cause folds by collapse of the insulation, with the risk of a rupture in the cellulose layers.

A further inconvenience is represented by the loss of flexibility of the cable. The layer of plastic material, extruded during the structure formation (for instance extruded between two paper layers in motion) has poor mechanical characteristics. The possible use of a bonding agent to couple plastic tapes to paper would prejudice the electrical characteristics, which suffer a considerable deterioration by reason of the presence of inadequate materials inside the insulation.

The electrical properties of cellulose paper, among which are the delta tangent value and the relative dielectric constant $\epsilon_r$ value, can be appreciably improved by the addition of borates or silicates capable of reducing the total electrical valence of the material (namely, the dipole number) by the formation of ionic compounds.

These treated papers are obtained, for instance, by dipping the paper tapes into baths of appropriate substances, such as boric acid and/or its salts, and then by drying them, and may show delta tangent values of the order of 0.4–0.5% and $\epsilon_r$ values of the order of 1.8–2.0. However, these improvements in the electrical properties are obtained in consequence of a salt content which makes this paper unduly brittle (in dry condition) and, therefore, unsuitable to be used as insulation in power cables. In fact, even with a relatively large thickness (for instance of 200 microns), there is a high risk of the paper breaking during the winding operations.

In the finished cable, this paper, owing to its brittleness, cannot be used due to the possible risk of ruptures, wrinkles and other collapse phenomena during the recovery or the paying-off of the cable itself.

Therefore, in spite of a theoretical and often recommended possiblity of use even in electrical cables, these types of cellulose paper containing such additives are really employed only for static systems or for systems such as transformers, condensers and the like, which are subjected to very reduced stresses.

An object of the present invention is to provide a tape-like material which is suitable for forming the insulation of electrical cables for very high voltages and which has reduced dielectric losses.

A further object of the invention is to provide said tape material with the maximum possible paper content so that a cable insulated with said material is flexible, easily impregnated and substantially devoid of any stress due to the swellings of the synthetic materials. In other words, the plastic material is mainly employed as a mechanical support for the cellulose material.

A further object of the invention is to provide a tape material of the above-indicated type in which the hot bonding between the plastic material and the cellulose material does not cause any degradation of the mechanical characteristics both of the plastic material and of the paper.

Another object of the invention is to provide an electrical cable, the insulation of which is at least partially formed by windings of the above-indicated tape-like material.

In accordance with the invention, the composite tape for the insulation of high voltage electrical cables comprises a paper layer bonded to at least one surface of a film of bi-oriented polymeric plastic material, characterized in that said paper has a content of borates or silicates in the range from about 0.1 to about 3% based on the weight of the paper, that the paper is bonded to the plastic film by a layer of copolymer which has a softening temperature lower than that of the plastic film and which has a thickness in the range from about 1 micron to about 10 microns, and that the thickness of all the plastic material of the composite tape is in the range from about 10 to about 30% of the tape total thickness.

In a preferred embodiment of the invention, the film of plastic material is made of bi-oriented polypropylene and is covered by a thin layer of propylene-ethylene copolymer.

The invention provides moreover an electrical power cable at least partially insulated with composite tapes of the above-described type.

Other objects and advantages of the present invention will be apparent from the following detailed description of the presently preferred embodiments thereof, which description should be considered in conjunction with the accompanying drawings in which.

Figure 1:
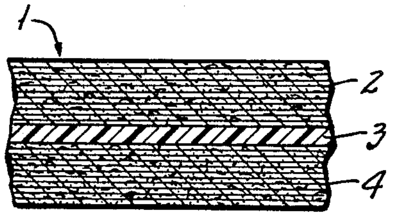
FIG. 1 is a fragmentary cross section of a composite tape according to the invention.

FIG. 1 shows, in cross section, the structure of a composite tape 1 according to the invention. The tape is formed of two paper layers 2 and 4 between which is sandwiched a tape or film 3 of polymeric plastic material having good general electrical characteristics and which is bonded to the layers 2 and 4 by a layer of a copolymer. Preferably, the paper layers 2 and 4 have the same thickness and are made of an additive-treated paper, obtained, for example, by dipping the paper into a solution of borate, such as boric acid or magnesium borates or of a silicate, and by a subsequent drying. The content of weight of the additive so introduced in the paper ranges between 0.1 and 3%, and preferably, between 0.5 and 1% of the paper weight.

The thickness of all the plastic material, with respect to the total tape thickness, is in the range from about 10 to about 30%, and preferably, in the range from 15 to 25%. The total tape thickness may vary according to the requirements. Preferably however, the thickness is between 50 and 200 microns, which values correspond to those normally in use. For example, in a tape obtained according to the structure shown in FIG. 1 and having a total thickness of 112 microns, the film 3 of plastic material can have a thickness of 20 microns, the bonding layer (not shown) can have a thickness of 2 microns, and each of the two paper layers 2 and 4 can have a thickness of about 45 microns, which corresponds to a ratio of plastic material to the total tape thickness of 19.6%.

Figure 2:
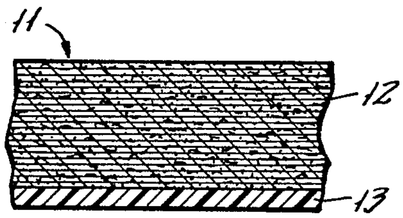
FIG. 2 is a fragmentary cross section of an alternative embodiment of a composite tape according to the invention.

In the embodiment illustrated in FIG. 2, the composite tape 11 is instead formed of only one layer of additive-treated paper 12, bonded to a film of plastic material 13. For providing a tape having a thickness of 100 microns, the thickness of the plastic material can be 18 microns, the bonding layer (not shown) can have a thickness of 2 microns, while the thickness of the paper layer can be 80 microns. Polyolefins are the polymeric plastic materials most suitable for the plastic layer by virtue of their good electrical characteristics (they are not polar and have a good dielectric strength), thermal properties (sufficiently high softening temperature) and mechanical features.

A particular appropriate plastic material has proved to be polypropylene. Another material giving good results is polymethyl-pentene, which melts at a temperature higher than that of polypropylene and offers, therefore, a further advantage during the sheathing of a cable with aluminum.

Figure 3:
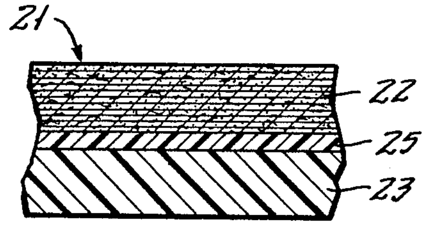
FIG. 3 is an enlarged, fragmentary section of a further alternative embodiment of the composite tape according to the invention.

FIG. 3 illustrates, in enlarged cross section, the structure of an embodiment of the composite tape shown in FIG. 2.

The tape 21 shown in FIG. 3 comprises a layer of additive-treated paper 22, bonded to a tape or film 23 of bi-oriented polypropylene, the molecules of which have been oriented by stretching along two orthogonal directions. The paper can be treated with additive as described hereinbefore, the content of which is in the ranges previously indicated for an additive.

The bonding of the two layers 22 and 23 is obtained by means of a thin layer or coat 25 of propylene-ethylene copolymer which is applied, for example, by extrusion thereof on the tape of bi-oriented polypropylene. This surface microlayer of polypropylene copolymer has a thickness of the order of a few microns, for example, about 1–10 microns and preferably, 2 microns, and is particularly suitable for achieving thermal bonding between polypropylene and paper.

Preferably, the propylene content of the layer 25 is higher than 80% by weight. In fact, the material constituting the microlayer adheres by affinity to polypropylene, and taking advantage of the fact that the softening temperature of the copolymer is lower than that of polypropylene, a stable bonding between the paper 22 and the tape 23 can be obtained without the melting of the tape 23. In other words, the laminated structure is effected at a temperature lower than the melting temperature of polypropylene, which therefore maintains all of its characteristics of mechanical resistance. In particular, the bi-oriented structure of polypropylene is not altered so that it has a greater resistance to swelling in contact with the impregnating agent and imparts a mechanical resistance to the composite tape.

Obviously, the composite tape could be built up with bi-oriented polypropylene covered on both faces by a polypropylene copolymer so as to obtain a composite tape having paper layers on both faces, analogous to the embodiment shown in FIG. 1.

Of course, it is possible to use other bi-oriented plastic materials and/or other copolymers to obtain the thermal bonding.

Figure 4:
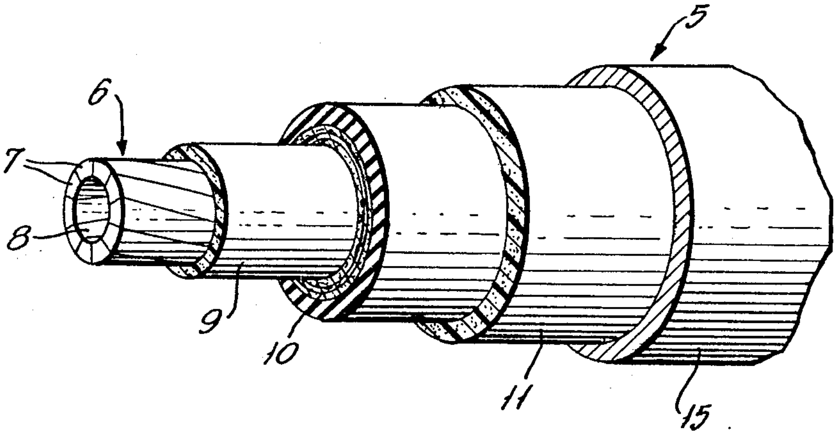
FIG. 4 is a perspective view of an oil-filled cable having insulation formed by the tape of the invention.

FIG. 4 illustrates a cable for conveying electrical energy at about 700 KV, which cable 5 comprises a conductor 6 formed by a plurality of keystone-shaped wires or straps 7 which define an inner duct 8 for an insulating oil and insulation 10 wound around the conductor 6. Between the conductor 6 and the insulation 10, there is a semi-conductor screen 9, and an external semi-conductive screen 11 is provided between the insulation 10 and the protective metal sheath 15 of the cable.

According to the invention, at least a part of the insulation 10 of the illustrated oil-filled cable 5 is obtained by winding composite tapes of the type described hereinbefore. If only a part of the insulation 10 is built up by using the illustrated composite tape, said part is, preferably, the innermost one, namely, the one nearest the conductor 6.

The following table provides a comparison between the mechanical characteristic of a laminated structure according to the invention, formed of a layer of 20 microns of bi-oriented polypropylene and covered on only one face with paper containing borates, the copolymer bonding layer having a thickness of 2 microns, and those of a conventional laminate having a thickness of polypropylene of 52 microns sandwiched between two paper layers.

In both laminate, the total thickness is 125 microns.

| | Tensile strength ($N/mm^2$) | | Ultimate elongation % | |
|---|---|---|---|---|
| | Longit. | Transvers. | Longit. | Transvers. |
| Paper-polypropylene-paper laminate | 48 | 24 | 2 | 5 |
| Tape according to the invention | 105 | 50 | 4 | 12 |

The invention achieves the goals of the invention both mechanically and electrically.

In fact, the composite tape according to the invention has low tangent δ and $\epsilon_r$ values which, in particular, are lower than those of the conventional paper-polypropylene-paper structures.

Further, the reduced thickness of the plastic material and its bi-orientation minimize the swelling caused by the impregnating oil when the composite tape is used to insulate a cable impregnated with oil. Such cable also has the required flexibility since the plastic material is present in a reduced amount.

Moreover, the tape has very good mechanical resistance characteristics which proves advantageous both during the conductor winding and in the subsequent operations to which the cable is subjected. In particular, for example, the composite tape has very good characteristics of tearing resistance, due to the film of bi-oriented polypropylene which has not suffered alterations during the bonding, since the softening has affected only the microlayer of copolymer.

In a composite tape according to the invention, there are no additional constraints as to the paper density, which can have values near the unity, while in the paper-polypropylene-paper laminates, the paper is preferably of the low density type.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A composite tape having a thickness in the range from 50 to 200 microns for the insulation of high voltage electrical cables, comprising a layer of cellulose paper bonded to at least one surface of a film of bi-oriented polymeric plastic material by a layer of copolymer plastic material having a softening temperature lower than the softening temperature of said bi-oriented polymeric plastic material wherein the improvement comprises including in said paper a weight content of mineral salt selected from the group consisting of borates and silicates in the range from about 0.1 to about 3% based on the weight of the paper, said copolymer layer being a microlayer and having a thickness in the range from about 1 micron to about 10 microns and all plastic material of the composition tape including the copolymer plastic material having a total thickness in the range from about 10 to about 30% of the total thickness of the tape whereby the cellulose paper which is relatively brittle because of the mineral salt content is supported by the plastic material and an improvement in both the mechanical and electrical properties of the composite tape is obtained while maintaining a maximum of cellulose content in the composite tape.

2. A tape as set forth in claim 1 wherein the weight content of mineral salts is in the range from 0.5 to 1% by weight of the paper and that the thickness of plastic material in the composite tape is in the range from 15 to 25% of the total thickness of the tape.

3. A tape as set forth in claim 1 wherein said mineral salts are borates.

4. A tape as set forth in claim 1 wherein said mineral salts are silicates.

5. A tape as set forth in claim 1 wherein said polymeric plastic material is a polyolefin.

6. A tape as set forth in claim 5 wherein said polymeric plastic material is polypropylene.

7. A tape as set forth in claim 5 wherein said polymeric plastic material is polymethyl-pentene.

8. A tape as set forth in claim 1 wherein said copolymer is a propylene-ethylene copolymer and said copolymer layer has a thickness of the order of 2 microns.

9. A high voltage electrical cable comprising at least one conductor having insulation therearound, said insulation comprising a winding of a composite tape having a thickness in the range from 50 to 200 microns, said tape comprising a layer of cellulose paper bonded to at least one surface of a film of bi-oriented polymeric plastic material by a layer of copolymer plastic material having a softening temperature lower than the softening temperature of said bi-oriented polymeric plastic material wherein the improvement comprises including in said paper a weight content of mineral salt selected from the group consisting of borates and silicates in the range from about 0.1 to about 3% based on the weight of the paper, said copolymer layer being a microlayer and having a thickness in the range from about 1 micron to about 10 microns and all plastic material of the composite tape including the copolymer plastic material having a total thickness in the range from about 10 to about 30% of the total thickness of the tape whereby the cellulose paper which is relatively brittle because of the mineral salt content is supported by the plastic material and an improvement in both the mechanical and electrical properties of the composite tape is obtained while maintaining a maximum of cellulose content in the composite tape.

10. A high voltage electrical cable as set forth in claim 9 wherein the weight content of mineral salts is in the range from 0.5 to 1% of weight of the paper and that the thickness of said plastic material is in the range from 15 to 25% of the total thickness of the tape.

11. A high voltage electrical cable comprising at least one conductor having insulation therearound, said insulation comprising a winding of a composite tape, said tape comprising a layer of cellulose paper bonded to at least one surface of a film of polymeric plastic material by a copolymer having a softening temperature lower than the softening temperature of said bi-oriented polymeric plastic material wherein the improvement comprises including in said paper a weight content of mineral salts selected from the group consisting of borates and silicates in the range from about 0.1 to about 3% based on the weight of the paper and said bi-oriented plastic material has a thickness in the range from about 10 to about 30% of the total thickness of the tape whereby an improvement in both the mechanical and electrical properties of the composite tape is obtained while maintaining a maximum of cellulose content in the tape.

12. A high voltage electrical cable as set forth in claim 9 wherein said mineral salts are silicates.

13. A high voltage electrical cable as set forth in claim 9 wheein said polymeric plastic material is a polyolefin.

14. A high voltage electrical cable as set forth in claim 9 wherein said polymeric plastic material is polypropylene.

15. A high voltage electrical cable as set forth in claim 9 wherein said polymeric plastic material is polymethyl-pentene.

16. A high voltage electrical cable as set forth in claim 9 wherein said copolymer is a propylene-ethylene copolymer and said copolymer layer has a thickness of the order of 2 microns.

* * * * *

UNITED STATES PATENT AND TRADEMARK OFFICE

CERTIFICATE OF CORRECTION

PATENT NO. : 4,853,490

DATED : August 1, 1989

INVENTOR(S) : Bosisio

It is certified that error appears in the above-identified patent and that said Letters Patent is hereby corrected as shown below:

Title page, item [57]
In the Abstract of the Disclosure, line 6, "form" should read --from--;

Claim 11 should read as follows:

11. A high voltage electrical cable as set forth in claim 9 wherein said mineral salts are borate.

Col. 7, line 9, "wheein" should read --wherein--.

Signed and Sealed this

Twenty-fourth Day of July, 1990

*Attest:*

HARRY F. MANBECK, JR.

*Attesting Officer*

*Commissioner of Patents and Trademarks*